(12) United States Patent
Shin et al.

(10) Patent No.: US 11,789,835 B2
(45) Date of Patent: Oct. 17, 2023

(54) TEST INPUT/OUTPUT SPEED CONVERSION AND RELATED APPARATUSES AND METHODS

(71) Applicant: Micron Technology, Inc., Boise, ID (US)

(72) Inventors: Sang-Hoon Shin, Boise, ID (US); Won Joo Yun, Boise, ID (US); Rajesh H. Kariya, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 132 days.

(21) Appl. No.: 16/953,828

(22) Filed: Nov. 20, 2020

(65) Prior Publication Data

US 2022/0164269 A1 May 26, 2022

(51) Int. Cl.
*G06F 11/27* (2006.01)
*G06F 1/00* (2006.01)
*G06F 13/00* (2006.01)
*G06F 1/12* (2006.01)
*G06F 13/20* (2006.01)

(52) U.S. Cl.
CPC ............. *G06F 11/27* (2013.01); *G06F 1/12* (2013.01); *G06F 13/20* (2013.01)

(58) Field of Classification Search
CPC ............ G06F 11/27; G06F 1/12; G06F 13/20
See application file for complete search history.

(56) References Cited

U.S. PATENT DOCUMENTS

| | | | |
|---|---|---|---|
| 10,451,674 B2* | 10/2019 | Dani | G01R 31/31727 |
| 2021/0088583 A1* | 3/2021 | Dono | G11C 11/4093 |
| 2022/0221512 A1* | 7/2022 | Rajagopal | G01R 31/31727 |

* cited by examiner

*Primary Examiner* — Justin R Knapp
(74) *Attorney, Agent, or Firm* — TraskBritt

(57) ABSTRACT

Test input/output speed conversion and related apparatuses and methods are disclosed. An apparatus includes a glue circuit and a BIST circuit for core circuitry of an integrated circuit device. The, the BIST circuit includes a test interface, one or more inputs, and one or more outputs. The BIST circuit is configured to operate at a first speed. The glue circuit is configured to interface with the test interface, the one or more inputs, and the one or more outputs of the BIST circuit. The glue circuit is configured to convert between second speed test interface signals and second speed input/output signals operating at a second speed and first speed test interface signals and first speed input/output signals operating at the first speed. The second speed is different from the first speed.

21 Claims, 10 Drawing Sheets

TEST INPUT/OUTPUT SPEED CONVERSION AND RELATED APPARATUSES AND METHODS

TECHNICAL FIELD

This disclosure relates generally to test input/output speed conversion, and more specifically to conversion between first speed signals and second speed signals for a built in self test (BIST) circuit that operates at the first speed.

BACKGROUND

The P1500 standard is a standard for testing operations specified by the Institute of Electrical and Electronics Engineers. The P1500 test interface is a test interface between an embedded core and a system chip, which may be used to test core interoperability. P1500 specifies a core test language (CTL) to transfer test knowledge about cores and a scalable wrapper. P1500 does not specify how to test the core itself. Rather, P1500 specifies the test wrapper around the core and its interface to one or more test access mechanisms (TAMs).

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
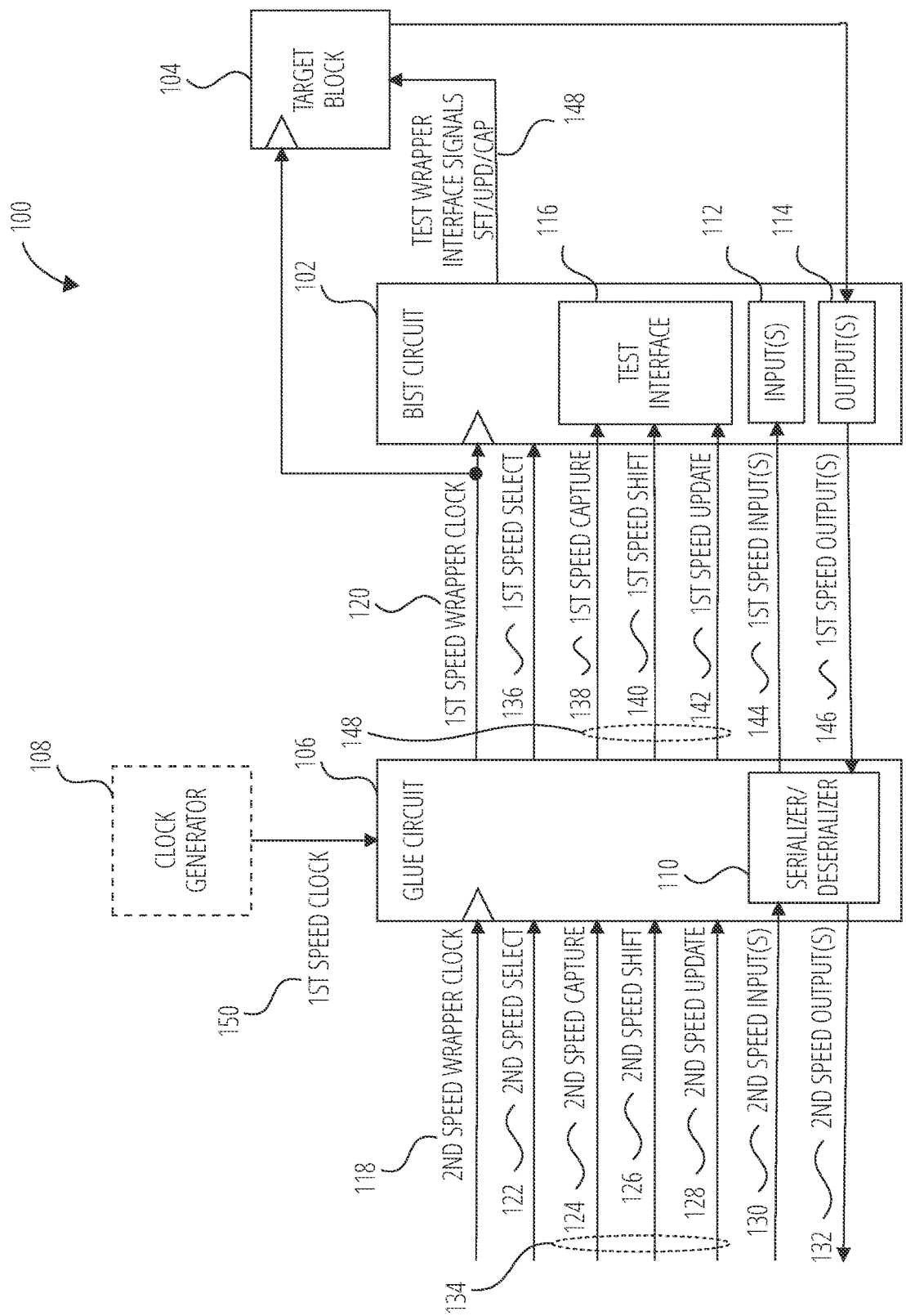
FIG. 1 is a block diagram of a test wrapper, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "speed," when used to describe a signal, refers to a frequency of the signal. According a "first speed signal" may refer to a signal having a first frequency and a "second speed signal" may refer to a signal having a second frequency.

Standard low-speed P1500 blocks and newer high-speed P1500 blocks are known in the art. By way of non-limiting examples, a high-speed P1500 block may operate at up to 800 megahertz (800 MHz) (e.g., in high bandwidth memory 2 (HBM2) memory devices) to 1.6 gigahertz (GHz) (e.g., in high bandwidth memory 3 (HBM3) memory devices), and a low-speed P1500 block may operate at speeds as low as 100 MHz. Only low-speed input/output is available for standard low-speed P1500 blocks. Such low-speed input-output, however, has a relatively long run time compared to high-speed input/output of the newer high-speed P1500 blocks. Accordingly, a system including a standard low-speed P1500 block may be required to check the memory parameters such as cell retention time to avoid data loss in P1500 mission mode interleaving cases.

The newer high-speed P1500 blocks avoid these drawbacks associated with the slow-speed input/output of a standard low-speed P1500 block because the newer high-speed P1500 blocks accept high-speed input/output associated with relatively shorter run time. These newer high-speed P1500 blocks, however, impose a relatively high design complexity both on the memory (e.g., dynamic random access memory (DRAM)) side and on the controller side to justify using a newer high-speed P1500 block merely for the associated shorter run time.

Proposed herein are glue circuits configured to convert between first speed input/output of BIST circuits and second speed input/output signals. A glue circuit may thus be used to convert between high-speed input/output signals and low-speed input/output of a standard low-speed P1500 block in order to provide the advantages associated with the shorter run time of high-speed input/output while avoiding the relatively high design complexity associated with newer high-speed P1500 blocks. A glue circuit may thus also be used to convert between low-speed input/output signals and high-speed input/output of a newer high-speed P1500 block in order to enable a newer high-speed P1500 block to interface with systems that would otherwise only be capable of interfacing with standard low-speed P1500 blocks because the systems may only utilize low-speed input/output signals instead of high-speed input/output signals.

In some embodiments an apparatus includes a glue circuit and a BIST circuit for core circuitry of an integrated circuit device. The BIST circuit includes a test interface, one or more inputs, and one or more outputs. The BIST circuit is configured to operate at a first speed. The glue circuit is configured to interface with the test interface, the one or more inputs, and the one or more outputs of the BIST circuit. The glue circuit is configured to convert between second speed test interface signals and second speed input/output signals operating at a second speed and first speed test interface signals and first speed input/output signals operating at the first speed. The second speed is different from the first speed.

In some embodiments an apparatus includes a BIST circuit, a glue circuit, and a clock generator. The BIST circuit is for core circuitry of an integrated circuit device. The BIST circuit includes a test interface, one or more inputs, and one or more outputs. The glue circuit is electrically connected to the test interface, the one or more inputs, and the one or more outputs of the BIST circuit. The glue circuit is configured to convert between second speed test interface signals and second speed input/output signals operating at a second speed and first speed test interface signals and first speed input/output signals operating at the first speed. The second speed is different from the first speed. The clock generator is configured to provide a first speed clock signal operating at the first speed to the glue circuit.

In some embodiments a method of interfacing with a BIST circuit includes providing a first speed wrapper clock signal to the BIST circuit. The first speed wrapper clock signal operates at a first speed. The method also includes providing first speed test interface signals operating at the first speed to a test interface of the BIST circuit responsive to second speed test interface signals operating at a second speed. The second speed is different from the first speed. The method further includes providing one or more first speed input signals operating at the first speed to one or more inputs of the BIST circuit responsive to one or more second speed input signals operating at the second speed. The method also includes providing one or more second speed output signals operating at the second speed responsive to one or more first speed output signals operating at the first speed received from one or more outputs of the BIST circuit.

In some embodiments an apparatus includes a circuit and a glue circuit. The circuit includes one or more inputs and one or more outputs. The circuit is configured to operate at a first speed. The one or more inputs are configured to receive one or more first speed input signals. The one or more outputs are configured to provide one or more first speed output signals. The glue circuit is configured to interface with the one or more inputs and the one or more outputs of the circuit. The glue circuit is configured to convert between one or more second speed input signals operating at a second speed and the one or more first speed input signals operating at the first speed. The glue circuit is further configured to convert between one or more second speed output signals operating at the second speed and the one or more first speed output signals operating at the first speed. The second speed is different from the first speed.

FIG. 1 is a block diagram of a test wrapper 100, according to some embodiments. The test wrapper 100 may be configured to test core circuitry of an integrated circuit device. Accordingly, an integrated circuit device may include the test wrapper 100 and the core circuitry. The test wrapper 100 includes a BIST circuit 102, a target block 104, a glue circuit 106, and optionally a clock generator 108. The BIST circuit 102 includes a test interface 116, one or more inputs 112, and one or more outputs 114. The BIST circuit is configured to operate at a first speed.

The glue circuit 106 is electrically connected to and configured to interface with the test interface 116, the one or more inputs 112, and the one or more outputs 114 of the BIST circuit 102. The glue circuit 106 is configured to convert between second speed signals operating at a second speed and first speed signals operating at the first speed. By way of non-limiting examples, the glue circuit 106 may be configured to convert between second speed test interface signals 134 (e.g., second speed capture signal 124, second speed shift signal 126, and second speed update signal 128) and first speed test interface signals 148 (e.g., first speed capture signal 138, first speed shift signal 140, and first speed update signal 142); between second speed input/output signals (e.g., one or more second speed input signals 130 and one or more second speed output signals 132) and first speed input/output signals (e.g., one or more first speed input signals 144 and one or more first speed output signals 146); between a second speed select signal 122 and a first speed select signal 136; and between a second speed wrapper clock signal 118 and a first speed wrapper clock signal 120.

The second speed is different from the first speed. Accordingly, the glue circuit 106 includes a serializer/deserializer 110 configured to serialize relatively slower parallel signals to produce relatively faster serial signals, and deserialize relatively faster serial signals to produce relatively slower parallel signals.

In some embodiments the first speed is slower than the second speed. In some such embodiments the serializer/deserializer 110 includes a deserializer (not shown) electrically connected to the one or more inputs 112. The deserializer may be configured to provide the one or more first speed input signals 144 (e.g., first speed parallel input signals) to the one or more inputs 112 responsive to the one or more second speed input signals 130 (e.g., a second speed serial input signal). For example, the deserializer may be configured to convert the one or more second speed input signals 130 (e.g., a second speed serial input signal) to the one or more first speed input signals 144 (e.g., first speed parallel input signals). The glue circuit 106 is configured to provide the first speed parallel input signals to the one or more inputs 112 of the BIST circuit 102. In such embodiments the serializer/deserializer 110 also includes a serializer (not shown) electrically connected to the one or more outputs 114. The serializer may be configured to provide the one or more second speed output signals 132 (e.g., a second speed serial output signal) responsive to the one or more first speed output signals 146 (e.g., first speed parallel output signals) received from the one or more outputs 114. For example, the serializer may be configured to convert the one or more first speed output signals 146 (e.g., first speed parallel output signals) received from the one or more outputs 114 of the BIST circuit 102 to the one or more second speed output signals 132 (e.g., a second speed serial output signal).

In some embodiments the first speed is faster than the second speed. In some such embodiments the serializer/deserializer 110 includes a serializer (not shown) electrically connected to the one or more inputs 112. The serializer may be configured to provide the one or more first speed input signals 144 (e.g., a first speed serial input signal) to the one or more inputs 112 responsive to the one or more second speed input signals 130 (e.g., second speed parallel input signals). For example, the serializer may be configured to convert the one or more second speed input signals 130 (e.g., second speed parallel input signals) to the one or more first speed input signals 144 (e.g., a first speed serial input signal). The glue circuit 106 is configured to provide the first speed serial input signal to the one or more inputs 112 of the BIST circuit 102. In such embodiments the glue circuit 106 also includes a deserializer (not shown) electrically connected to the one or more outputs 114. The deserializer may be configured to provide the one or more second speed output signals 132 (e.g., second speed parallel output signals) responsive to the one or more first speed output signals 146 (e.g., a first speed serial output signal) received from the one or more outputs 114. For example, the deserializer may be configured to convert the one or more first speed output signals 146 (e.g., a first speed serial output signal) received from the one or more outputs 114 of the BIST circuit 102 to the one or more second speed output signals 132 (e.g., second speed parallel output signals).

The glue circuit 106 is configured to provide, to the BIST circuit 102 and to the target block 104, a first speed wrapper clock signal 120 configured to operate at the first speed. Accordingly, the BIST circuit 102 and the target block 104 are configured to operate at the first speed. The glue circuit 106 is also configured to receive the second speed wrapper clock signal 118 operating at the second speed.

In embodiments where the test wrapper 100 includes the clock generator 108, the clock generator is configured to provide a first speed clock signal 150 operating at the first speed to the glue circuit 106. By way of non-limiting example, the clock generator 108 may be configured to provide the first speed clock signal 150 responsive to a reference clock signal (not shown) (e.g., an external clock signal, an internal clock signal, etc.). The glue circuit 106 may be configured to use the first speed clock signal 150 in the conversion between the second speed signals and the first speed signals. In some embodiments, however, the test wrapper 100 may not include a clock generator 108, in which case the glue circuit 106 may receive the first speed clock signal 150 from outside of the test wrapper 100 (e.g., from external to the integrated circuit device, from the core circuitry, etc.).

The test wrapper 100 is configured to enable testing of the core circuitry of the integrated circuit device. By way of non-limiting example, the core circuitry may include circuitry for a logic die of a high bandwidth memory device (HBM device). Also by way of non-limiting example, the BIST circuit 102 may include a P1500 BIST circuit. As a further non-limiting example the BIST circuit 102 may include a P1500 wrapper control block. As another non-limiting example, the BIST circuit 102 may include another serial interface BIST circuit such as a Joint Test Action Group (JTAG) (IEEE1194.1) BIST.

Figure 2:
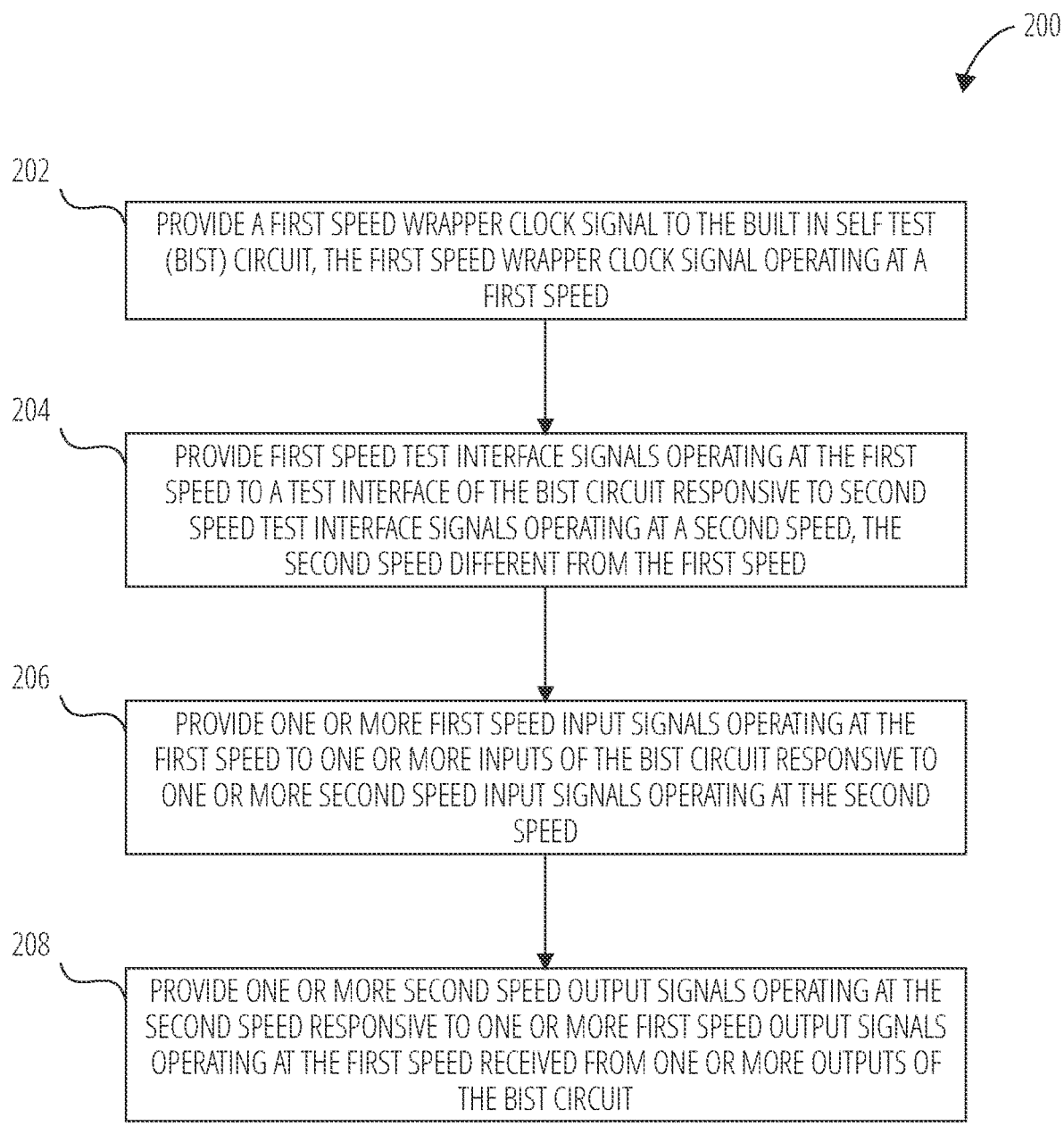
FIG. 2 is a flowchart illustrating a method of interfacing with a BIST circuit, according to some embodiments.

FIG. 2 is a flowchart illustrating a method 200 of interfacing with a BIST circuit (e.g., the BIST circuit 102 of FIG. 1), according to some embodiments. In operation 202, method 200 provides a first speed wrapper clock signal to the BIST circuit, the first speed wrapper clock signal operating at a first speed.

In operation 204, method 200 provides first speed test interface signals operating at the first speed to a test interface of the BIST circuit responsive to second speed test interface signals operating at a second speed, the second speed different from the first speed. In some embodiments, providing the first speed test interface signals includes providing first speed select, capture, shift, and update wrapper signals responsive to second speed select, capture, shift, and update wrapper signals.

In operation 206, method 200 provides one or more first speed input signals operating at the first speed to one or more inputs of the BIST circuit responsive to one or more second speed input signals operating at the second speed. In some embodiments providing the one or more first speed input signals responsive to the one or more second speed input signals includes providing first speed parallel input signals responsive to a second speed serial input signal. In some embodiments providing the one or more first speed input signals responsive to the one or more second speed input signals includes providing a first speed serial input signal responsive to second speed parallel input signals.

In operation 208, method 200 provides one or more second speed output signals operating at the second speed responsive to one or more first speed output signals operating at the first speed received from one or more outputs of the BIST circuit. In some embodiments providing the one or more second speed output signals responsive to the one or more first speed output signals includes providing a second speed serial output signal responsive to first speed parallel output signals. In some embodiments providing the one or more second speed output signals responsive to the one or more first speed output signals includes providing second speed parallel output signals responsive to a first speed serial output signal.

Figure 3:
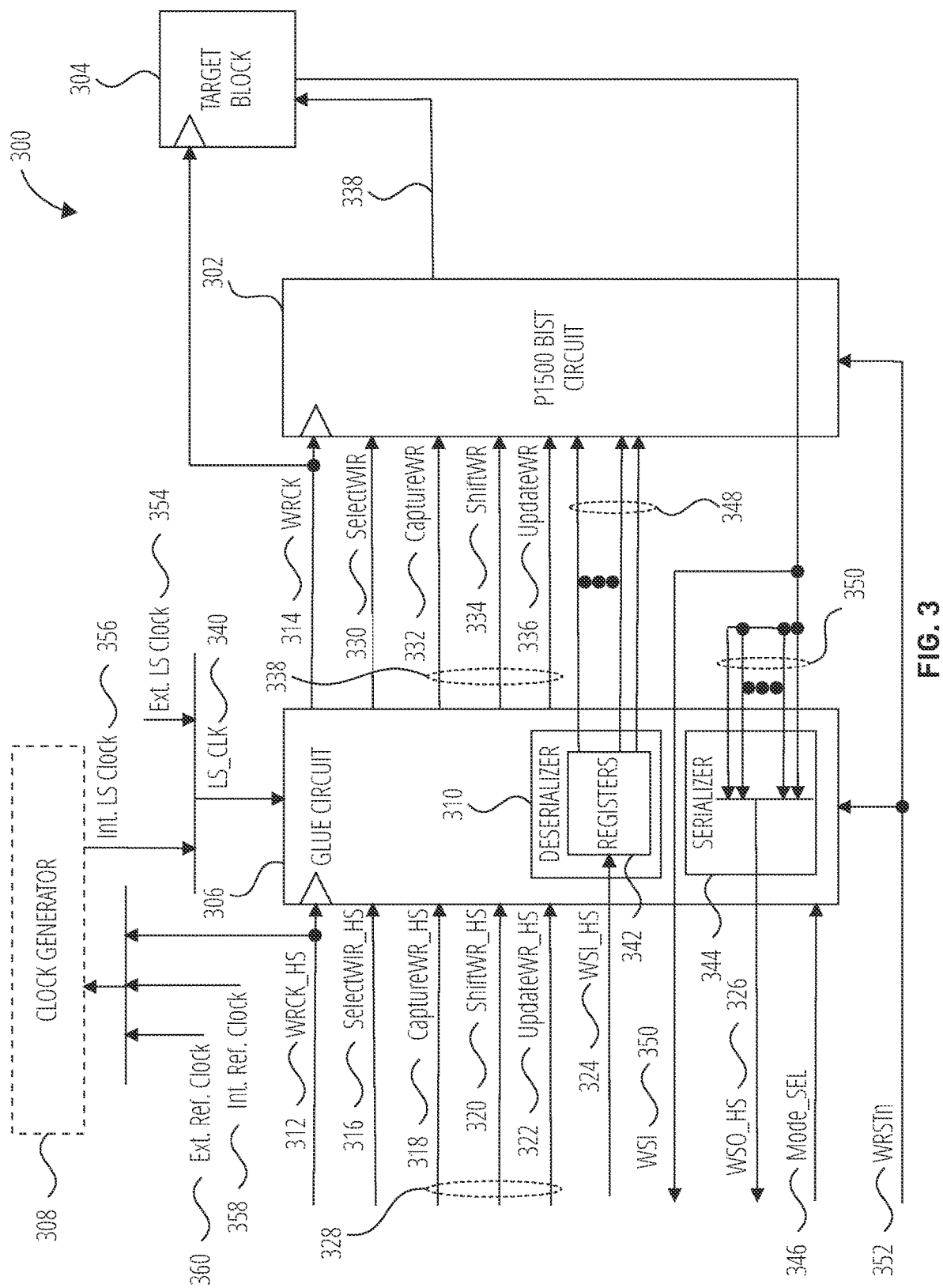
FIG. 3 is block diagram of a test wrapper, which is an example of the test wrapper of FIG. 1, and which interfaces between high-speed signals and a low-speed P1500 BIST circuit, according to some embodiments.

FIG. 3 is block diagram of a test wrapper 300, which is an example of the test wrapper 100 of FIG. 1, and which interfaces between high-speed signals and a low-speed P1500 BIST circuit 302 (e.g., a P1500 wrapper control block), according to some embodiments. The test wrapper 300 includes a P1500 BIST circuit 302, a target block 304, a glue circuit 306, and a clock generator 308, which are similar to the BIST circuit 102, the target block 104, the glue circuit 106, and the clock generator 108 discussed above with reference to FIG. 1. The P1500 BIST circuit 302, however, is configured to operate at low speed. In other words, the P1500 BIST circuit 302 may be for a low-speed P1500 interface.

The glue circuit 306 is configured to convert between high-speed P1500 signals (which are not compatible to the low-speed P1500 BIST circuit 302) and low-speed P1500 signals (which are compatible with the P1500 BIST circuit 302). The glue circuit 306 is configured to receive a high-speed wrapper clock signal 312 and provide a low-speed wrapper clock signal 314 to the P1500 BIST circuit 302. The glue circuit 306 is also configured to receive a high-speed wrapper select signal 316, convert the high-speed wrapper select signal 316 to a low-speed wrapper select signal 330, and provide the low-speed wrapper select signal 330 to the P1500 BIST circuit 302. The glue circuit 306 is further configured to receive high-speed test interface signals 328 (e.g., high-speed wrapper capture signal 318, high-speed wrapper shift signal 320, and high-speed wrapper update signal 322); convert the high-speed test interface signals 328 to low-speed test interface signals 338 (e.g., low-speed wrapper capture signal 332, low-speed wrapper shift signal 334, and low-speed wrapper update signal 336); and provide the low-speed test interface signals 338 to the P1500 BIST circuit 302. The P1500 BIST circuit 302 is configured to provide the low-speed test interface signals 338 to the target block 304.

The glue circuit 306 is also configured to receive high-speed serial wrapper input signal 324, convert (using a deserializer 310) the high-speed serial wrapper input signal 324 to low-speed parallel wrapper input signals 348, and provide the low-speed parallel wrapper input signals 348 to the P1500 BIST circuit 302. By way of non-limiting example, the deserializer 310 may include registers 342 configured to store individual bits of data taken from the high-speed serial wrapper input signal 324 to separately provide the bits of data in a low-speed parallel wrapper input signals 348. The glue circuit 306 is further configured to receive low-speed parallel wrapper output signals 350 from the P1500 BIST circuit 302 and the target block 304, convert (using serializer 344) the low-speed parallel wrapper output signals 350 to high-speed serial wrapper output signal 326, and provide the high-speed serial wrapper output signal 326.

The clock generator 308 may be an optional element of the test wrapper 300, as was previously discussed with reference to the clock generator 108 of FIG. 1. In embodiments where the test wrapper 300 includes the clock generator 308, however, the clock generator 308 may be configured to receive the high-speed wrapper clock signal 312, an internal reference clock signal 358, an external reference clock signal 360, or combinations thereof, and generate an internal low-speed clock signal 356 in response. By way of non-limiting example, the clock generator 308 may include a clock divider configured to generate the internal low-speed clock signal 356 responsive to the high-speed wrapper clock signal 312, the internal reference clock signal 358, or the external reference clock signal 360. In some embodiments (e.g., embodiments where the test wrapper 300 does not include the clock generator 308), an external low-speed clock signal 354 may be provided. The glue circuit 306 is configured to receive a Low-speed clock signal 340, which includes the internal low-speed clock signal 356 (e.g., in embodiments where the test wrapper 300 includes the clock generator 308), or which includes the external low-speed clock signal 354 (e.g., in embodiments where the test wrapper 300 does not include the clock generator 308). In some embodiments the clock generator 308 includes a reference clock selector configured to select between the high-speed wrapper clock signal 312, the internal reference clock signal 358, and the external reference clock signal 360.

As previously discussed, the glue circuit 306 converts between high-speed signals and low-speed signals, the low speed signals (e.g., low-speed wrapper clock signal 314, low-speed wrapper select signal 330, low-speed wrapper capture signal 332, low-speed wrapper shift signal 334, low-speed wrapper update signal 336, and low-speed parallel wrapper input signals 348). These low-speed signals may be gated by the low-speed clock signal 340.

In some embodiments the glue circuit 306 may be configured to selectively operate in a speed-conversion operational mode or in a bypass operational mode responsive to a mode select signal 346. In the speed conversion operational mode the glue circuit 306 may operate as discussed above to convert between high-speed signals and low-speed signals to enable interface of high-speed signals with the low-speed P1500 BIST circuit 302. In the bypass operational mode, however, high-speed signals may be merely passed to and from the P1500 BIST circuit 302 without conversion between high-speed and low-speed signals.

The glue circuit 306 and the P1500 BIST circuit 302 are configured to receive a wrapper reset signal 352. Responsive to an assertion of the wrapper reset signal 352 the glue circuit 306 and the P1500 BIST circuit 302 are configured to reset.

It is noted that in some embodiments the glue circuit 306 may be configured to provide the low-speed parallel wrapper output signals 350 received from the P1500 BIST circuit 302 in addition to the high-speed serial wrapper output signal 326.

Figure 4:
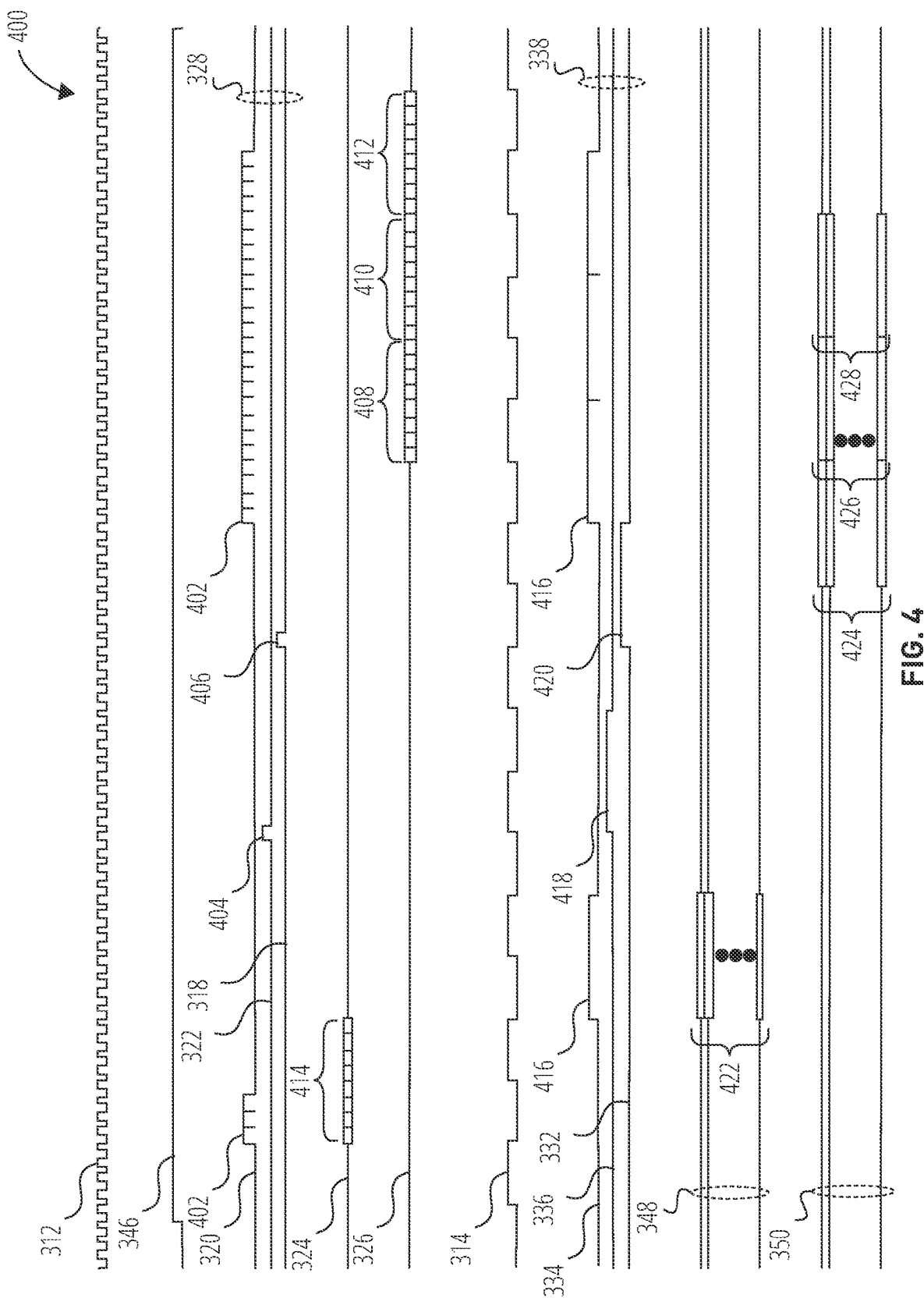
FIG. 4 is a signal timing diagram of examples of signals of the test wrapper of FIG. 3.

FIG. 4 is a signal timing diagram of examples of signals 400 of the test wrapper 300 of FIG. 3. Referring to FIG. 3 and FIG. 4 together, the signals 400 include the high-speed wrapper clock signal 312, the mode select signal 346, the high-speed test interface signals 328 (high-speed wrapper shift signal 320, the high-speed wrapper update signal 322, and the high-speed wrapper capture signal 318), the high-speed serial wrapper input signal 324, the high-speed serial wrapper output signal 326, the low-speed wrapper clock signal 314, the low-speed test interface signals 338 (the low-speed wrapper shift signal 334, the low-speed wrapper update signal 336, and the low-speed wrapper capture signal 332), the low-speed parallel wrapper input signals 348, and the low-speed parallel wrapper output signals 350.

As illustrated in FIG. 4, the high-speed wrapper clock signal 312 oscillates at a higher frequency than the low-speed wrapper clock signal 314. Accordingly, command pulses of the low-speed test interface signals 338 have longer time widths than command pulses of the high-speed test interface signals 328. By way of non-limiting example, low-speed shift command pulses 416 of the low-speed wrapper shift signal 334 have longer time widths than their corresponding high-speed shift command pulses 402 of the high-speed wrapper shift signal 320. As another non-limiting example, a low-speed update command pulse 418 of the low-speed wrapper update signal 336 has a longer time width than a corresponding high-speed update command pulse 404 of the high-speed wrapper update signal 322. As a further, non-limiting example, a low-speed capture command pulse 420 of the low-speed wrapper capture signal 332 has a longer time width than a corresponding high-speed capture command pulse 406 of the high-speed wrapper capture signal 318.

FIG. 4 also illustrates low-speed parallel input data 422 of the low-speed parallel wrapper input signals 348, which corresponds to high-speed serial input data 414 of the high-speed serial wrapper input signal 324. FIG. 4 further illustrates first low-speed parallel output data 424, second low-speed parallel output data 426, and third low-speed parallel output data 428 of the low-speed parallel wrapper output signals 350, which correspond to first high-speed serial output data 408, second high-speed serial output data 410, and third high-speed serial output data 412, respectively, of the high-speed serial wrapper output signal 326.

Figure 5:
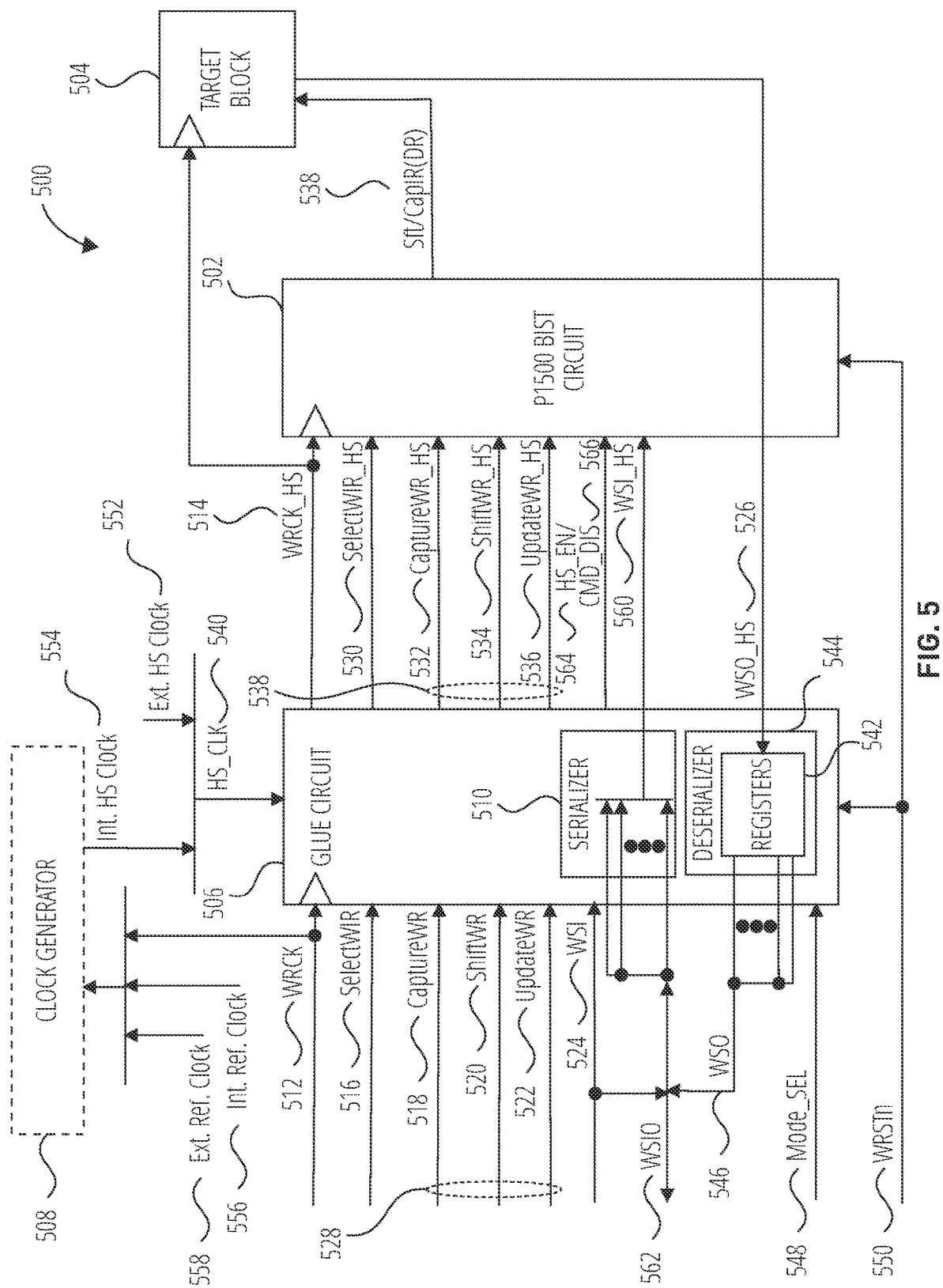
FIG. 5 is a block diagram of a test wrapper, which is an example of the test wrapper of FIG. 1, and which interfaces between low-speed signals and a high-speed P1500 BIST circuit, according to some embodiments.

FIG. 5 is a block diagram of a test wrapper 500, which is an example of the test wrapper 100 of FIG. 1, and which interfaces between low-speed signals and a high-speed P1500 BIST circuit 502 (e.g., a high-speed P1500 wrapper control block), according to some embodiments. The test wrapper 500 includes a P1500 BIST circuit 502, a target block 504, a glue circuit 506, and optionally a clock generator 508 similar to the BIST circuit 102, target block 104, glue circuit 106, and clock generator 108 of FIG. 1. The P1500 BIST circuit 502, however, is configured to operate at high speed. In other words, the P1500 BIST circuit 502 may be for a high-speed P1500 interface.

The glue circuit 506 is configured to convert between low-speed P1500 signals (which are not compatible to the high-speed P1500 BIST circuit 502) and high-speed P1500 signals (which are compatible with the P1500 BIST circuit 502). The glue circuit 506 is configured to receive a low-speed wrapper clock signal 512 and provide a high-speed wrapper clock signal 514 to the P1500 BIST circuit 502. The glue circuit 506 is also configured to receive a low-speed wrapper select signal 516, convert the low-speed wrapper select signal 516 to a high-speed wrapper select signal 530, and provide the high-speed wrapper select signal 530 to the P1500 BIST circuit 502. The glue circuit 506 is further configured to receive low-speed test interface signals 528 (e.g., low-speed wrapper capture signal 518, low-speed wrapper shift signal 520, and low-speed wrapper update signal 522); convert the low-speed test interface signals 528 to high-speed test interface signals 538 (e.g., high-speed wrapper capture signal 532, high-speed wrapper shift signal 534, and high-speed wrapper update signal 536); and provide the high-speed test interface signals 538 to the P1500 BIST circuit 502. The P1500 BIST circuit 502 is configured to provide the high-speed test interface signals 538 (Sft/CapIR(DR)) to the target block 504.

The glue circuit 506 is also configured to receive low-speed parallel wrapper input signals 524, convert (using a serializer 510) the low-speed parallel wrapper input signals 524 to a high-speed serial wrapper input signal 560, and provide the high-speed serial wrapper input signal 560 to the P1500 BIST circuit 502. The glue circuit 506 is further configured to receive a high-speed serial wrapper output signal 526 from the P1500 BIST circuit 502 and the target block 504, convert (using a deserializer 544) the high-speed serial wrapper output signal 526 to low-speed parallel wrapper output signals 546, and provide the low-speed parallel wrapper output signals 546. By way of non-limiting example, the deserializer 544 may include registers 542 configured to store individual bits of data of the high-speed serial wrapper output signal 526 to separate the bits into parallel channels of a the low-speed parallel wrapper output signals 546. Bidirectional low-speed parallel input/output signals 562 including the low-speed parallel wrapper input signals 524 and the low-speed parallel wrapper output signals 546 may therefore be exchanged by the glue circuit 506.

The clock generator 508 may be an optional element of the test wrapper 500, as was previously discussed with reference to the clock generator 108 of FIG. 1. In embodiments where the test wrapper 500 includes the clock generator 508, however, the clock generator 508 may be configured to receive the low-speed wrapper clock signal 512, an internal reference clock signal 556, an external reference clock signal 558, or combinations thereof, and generate an internal high-speed clock signal 554 in response. By way of non-limiting example, the clock generator 508 may include a clock counter configured to generate the internal high-speed clock signal 554 responsive to the low-speed wrapper clock signal 512, the internal reference clock signal 556, or the external reference clock signal 558. In some embodiments (e.g., embodiments where the test wrapper 500 does not include the clock generator 508), an external high-speed clock signal 552 may be provided. The glue circuit 506 is configured to receive a high-speed clock signal 540, which includes the internal high-speed clock signal 554 (e.g., in embodiments where the test wrapper 500 includes the clock generator 508), or which includes the external high-speed clock signal 552 (e.g., in embodiments where the test wrapper 500 does not include the clock generator 508). In some embodiments the clock generator 508 includes a reference clock selector configured to select between the low-speed wrapper clock signal 512, the internal reference clock signal 556, and the external reference clock signal 558.

As previously discussed, the glue circuit 506 converts between low-speed signals and high-speed signals (e.g., high-speed wrapper clock signal 514, high-speed wrapper select signal 530, high-speed wrapper capture signal 532, high-speed wrapper shift signal 534, high-speed wrapper update signal 536, and the high-speed serial wrapper input signal 560). These high-speed signals may be gated by the high-speed clock signal 540.

The glue circuit 506 may be configured to provide a high-speed enable signal 564 and a command disable signal 566 to the P1500 BIST circuit 502. The P1500 BIST circuit 502 may be configured to selectively operate in one of a low-speed operational mode and a high-speed operational mode responsive to the high-speed enable signal 564 provided by the glue circuit 506. By way of non-limiting example, the P1500 BIST circuit 502 may be configured to operate in the high-speed operational mode while the high-speed enable signal 564 is asserted to a logic level high voltage potential and in the low-speed operational mode while the high-speed enable signal 564 is de-asserted to a logic level low voltage potential. The P1500 BIST circuit 502 may be configured to cut signals for faster operation responsive to an assertion of the command disable signal 566.

Similar to the glue circuit 306 and the P1500 BIST circuit 302 of FIG. 3, the glue circuit 506 and the P1500 BIST circuit 502 are configured to receive a wrapper reset signal 550 and reset responsive to an assertion of the wrapper reset signal 550.

In some embodiments the glue circuit 506 may be configured to selectively operate in a speed-conversion operational mode or in a bypass operational mode responsive to a mode select signal 548. In the speed conversion operational mode the glue circuit 506 may operate as discussed above to convert between low-speed signals and high-speed signals to enable interface of low-speed signals with the high-speed P1500 BIST circuit 502. In the bypass operational mode, however, high-speed signals may be merely passed to and from the P1500 BIST circuit 502 without conversion between low-speed and high-speed signals.

Figure 6:
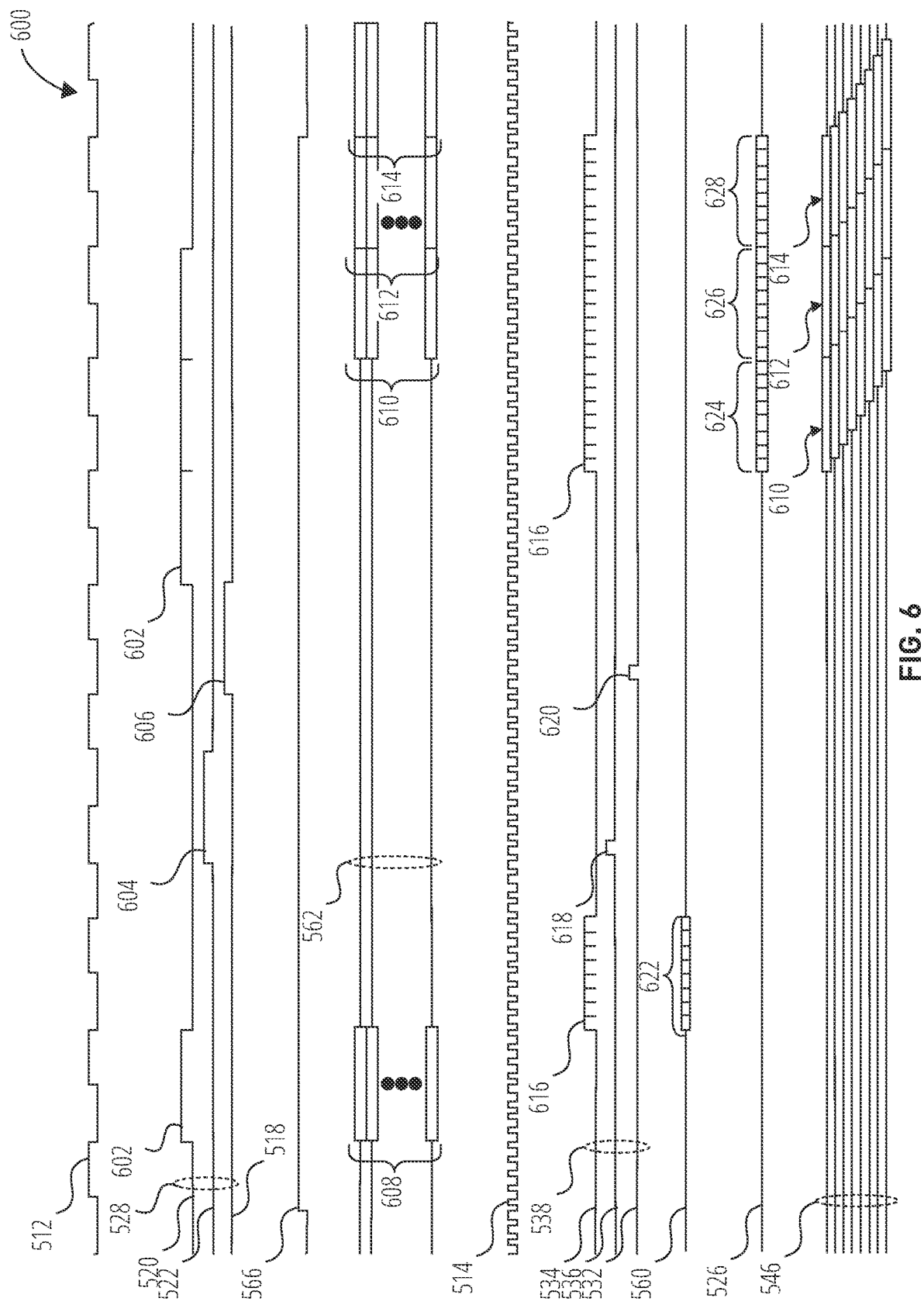
FIG. 6 is a signal timing diagram of examples of signals of the test wrapper of FIG. 6.

FIG. 6 is a signal timing diagram of examples of signals 600 of the test wrapper 500 of FIG. 5. Referring to FIG. 5 and FIG. 6 together, the signals 600 include the low-speed wrapper clock signal 512, the low-speed test interface signals 528 (the low-speed wrapper shift signal 520, the low-speed wrapper update signal 522, and the low-speed wrapper capture signal 518), the high-speed enable signal 564, the low-speed parallel input/output signals 562, the high-speed wrapper clock signal 514, the high-speed test interface signals 538 (the high-speed wrapper shift signal 534, the high-speed wrapper update signal 536, and the high-speed wrapper capture signal 532), the high-speed serial wrapper input signal 560, the high-speed serial wrapper output signal 526, and the low-speed parallel wrapper output signals 546.

As illustrated in FIG. 6, the low-speed wrapper clock signal 512 oscillates at a lower frequency than the high-speed wrapper clock signal 514. Accordingly, command pulses of the low-speed test interface signals 528 have longer time widths than command pulses of the high-speed test interface signals 538. By way of non-limiting example, low-speed shift command pulses 602 of the low-speed wrapper shift signal 520 have longer time widths than their corresponding high-speed shift command pulses 616 of the high-speed wrapper shift signal 534. As another non-limiting example, a low-speed update command pulse 604 of the low-speed wrapper update signal 522 has a longer time width than a corresponding high-speed update command pulse 618 of the high-speed wrapper update signal 536. As a further, non-limiting example, a low speed capture command pulse 606 of the low-speed wrapper capture signal 518 has a longer time width than a corresponding high-speed capture command pulse 620 of the high-speed wrapper capture signal 532.

FIG. 6 also illustrates high-speed serial input data 622 of the high-speed serial wrapper input signal 560, which corresponds to low-speed parallel input data 608 of the low-speed parallel input/output signals 562. FIG. 6 further illustrates first high-speed serial output data 624, second high-speed serial output data 626, and third high-speed serial output data 628 of the high-speed serial wrapper output signal 526, which correspond to first low-speed parallel output data 610, second low-speed parallel output data 612, and third low-speed parallel output data 614, respectively, of the low-speed parallel input/output signals 562 and the low-speed parallel wrapper output signals 546.

Figure 7:
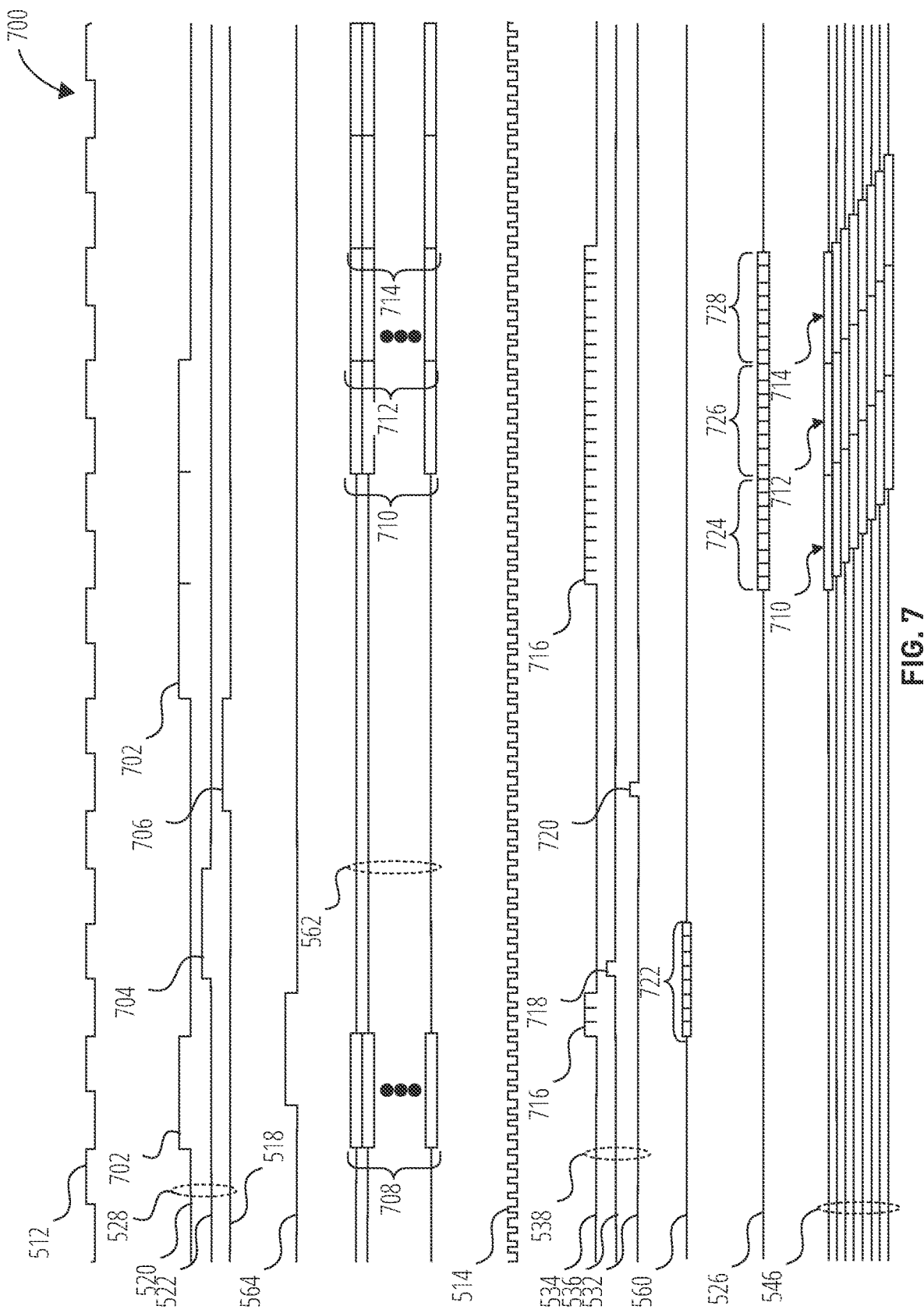
FIG. 7 is a signal timing diagram of other examples of signals of the test wrapper of FIG. 5.

FIG. 7 is a signal timing diagram of other examples of signals 700 of the test wrapper 500 of FIG. 5. Referring to FIG. 5 and FIG. 7 together, the signals 700 include the low-speed wrapper clock signal 512, the low-speed test interface signals 528 (the low-speed wrapper shift signal 520, the low-speed wrapper update signal 522, and the low-speed wrapper capture signal 518), the command disable signal 566, the low-speed parallel input/output signals 562, the high-speed wrapper clock signal 514, the high-speed test interface signals 538 (the high-speed wrapper shift signal 534, the high-speed wrapper update signal 536, and the high-speed wrapper capture signal 532), the high-speed serial wrapper input signal 560, the high-speed serial wrapper output signal 526, and the low-speed parallel wrapper output signals 546.

Similar to the command pulses of the low-speed wrapper shift signal 520 illustrated in FIG. 6, the low-speed wrapper shift signal 520 illustrated in FIG. 7 have longer time widths than the command pulses of the high-speed test interface signals 538. By way of non-limiting example, low-speed shift command pulses 702 of the low-speed wrapper shift signal 520 have longer time widths than their corresponding high-speed shift command pulses 716 of the high-speed wrapper shift signal 534. As another non-limiting example, a low-speed update command pulse 704 of the low-speed wrapper update signal 522 has a longer time width than a corresponding high-speed update command pulse 718 of the high-speed wrapper update signal 536. As a further, non-limiting example, a low speed capture command pulse 706 of the low-speed wrapper capture signal 518 has a longer time width than a corresponding high-speed capture command pulse 720 of the high-speed wrapper capture signal 532.

FIG. 7 also illustrates high-speed serial input data 722 of the high-speed serial wrapper input signal 560, which corresponds to low-speed parallel input data 708 of the low-speed parallel input/output signals 562. FIG. 7 further illustrates first high-speed serial output data 724, second high-speed serial output data 726, and third high-speed serial output data 728 of the high-speed serial wrapper output signal 526, which correspond to first low-speed parallel output data 710, second low-speed parallel output data 712, and third low-speed parallel output data 714, respectively, of the low-speed parallel input/output signals 562 and the low-speed parallel wrapper output signals 546.

Figure 8:
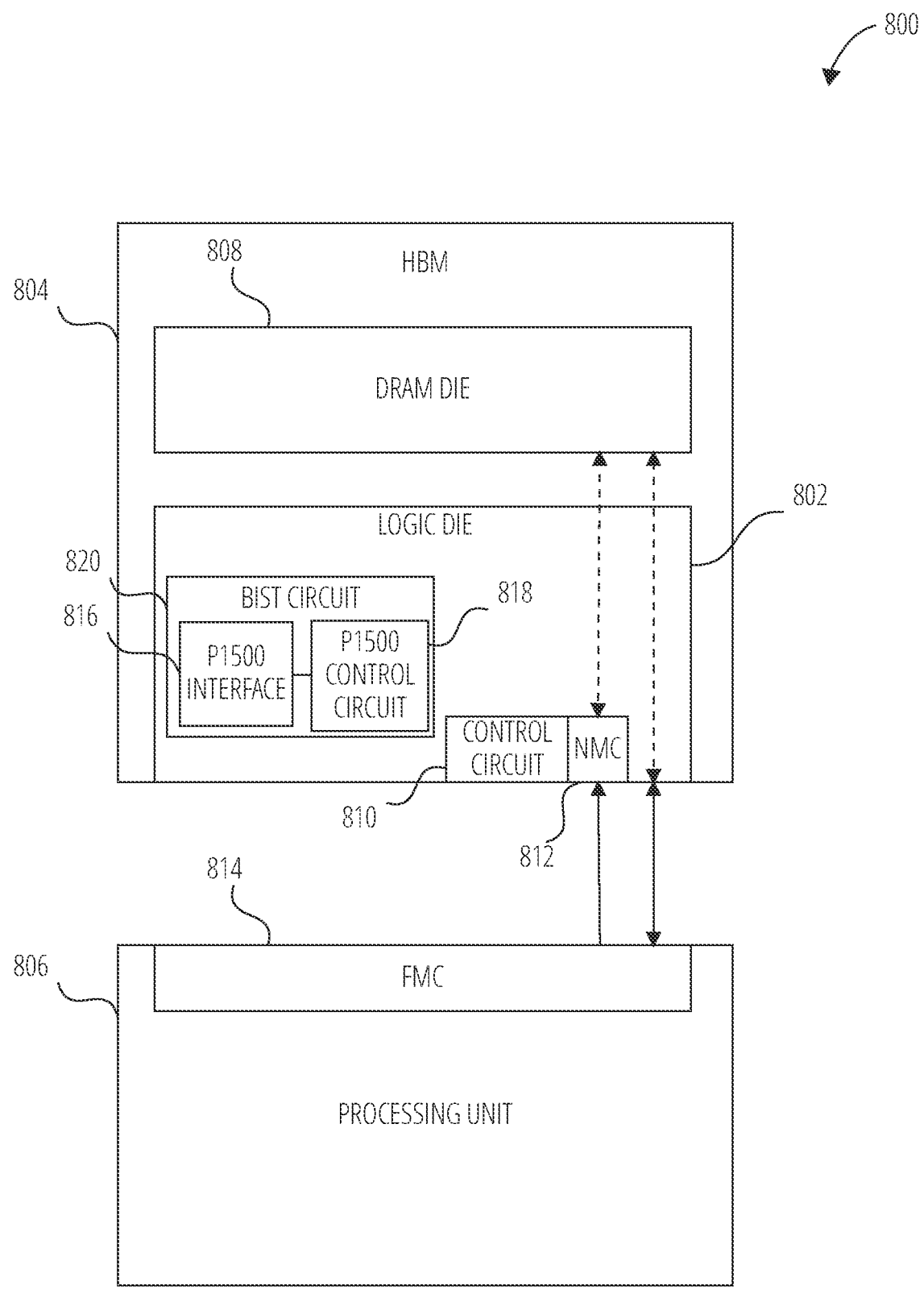
FIG. 8 is a block diagram of a high-bandwidth memory plus (HBM+) system, according to some embodiments.

FIG. 8 is a block diagram of an HBM+ system 800, according to some embodiments. The HBM+ system 800 includes an HBM 804 and a processing unit 806 (e.g., a central processing unit (CPU), a graphics processing unit (GPU), an accelerated processing unit (APU), etc.) operably coupled to the HBM 804. The HBM 804 includes a dynamic random access memory die, DRAM die 808, and a logic die 802. The logic die 802 includes a control circuit 810 and a near memory controller, NMC 812. The processing unit 806 includes a far memory controller, FMC 814.

The NMC 812 and the FMC 814 are configured to function as memory controller masters. The FMC 814 includes an off-HBM memory controller and the NMC 812 includes an on-HBM memory controller that is located on the logic die 802 of the HBM 804. By way of non-limiting example, the logic die 802 may correspond to a bottom layer of a 3D-stack memory that is the HBM 804, while the DRAM die 808 may correspond to one of the upper layers of the HBM 804. The logic die 802 may control the DRAM die 808 using the NMC 812, which may be instructed by the control circuit 810 to control the DRAM die 808. It should be noted that either or both of the NMC 812 and the FMC 814 may be represented by a general memory controller.

The logic die 802 includes a P1500 test wrapper 820 including a P1500 interface 816 operably coupled to a P1500 control circuit 818. The P1500 test wrapper 820 is configured to test the logic die 802. For example, the P1500 interface 816 may include a glue circuit according to embodiments disclosed herein (e.g., glue circuit 106 of FIG. 1, glue circuit 306 of FIG. 3, glue circuit 506 of FIG. 5), and the P1500 control circuit 818 may include a P1500 BIST circuit according to embodiments disclosed herein (e.g., BIST circuit 102 of FIG. 1, P1500 BIST circuit 302 of FIG. 3, P1500 BIST circuit 502 of FIG. 5).

Figure 9:
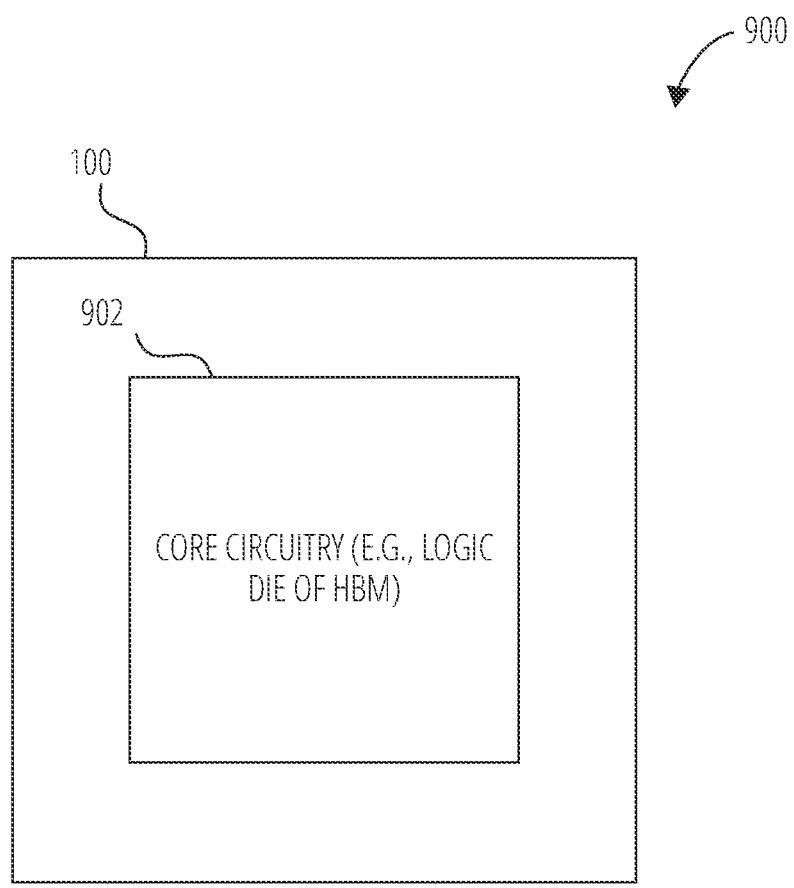
FIG. 9 is a block diagram of an integrated circuit device, according to some embodiments.

FIG. 9 is a block diagram of an integrated circuit device 900, according to some embodiments. The integrated circuit device 900 includes core circuitry 902 (e.g., a logic die of an HBM) and a test wrapper 100 configured to test the core circuitry 902.

Figure 10:
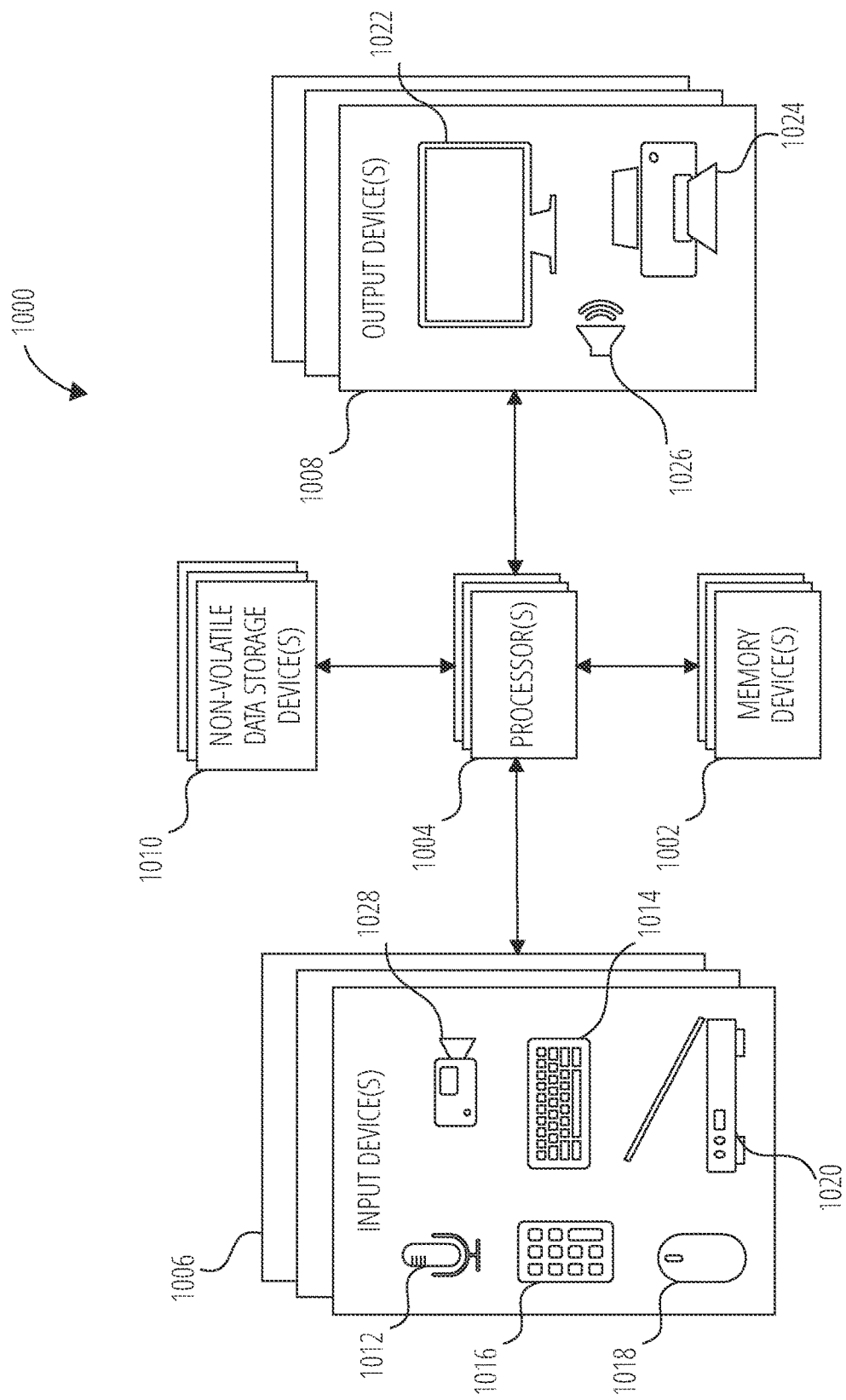
FIG. 10 is a block diagram of a computing system, according to some embodiments.

FIG. 10 is a block diagram of a computing system 1000, according to some embodiments. The computing system 1000 includes one or more processors 1004 operably coupled to one or more memory devices 1002, one or more non-volatile data storage devices 1010, one or more input devices 1006, and one or more output devices 1008. In some embodiments the computing system 1000 includes a personal computer (PC) such as a desktop computer, a laptop computer, a tablet computer, a mobile computer (e.g., a smartphone, a personal digital assistant (PDA), etc.), a network server, or other computer device.

In some embodiments the one or more processors 1004 may include a central processing unit (CPU) or other processor configured to control the computing system 1000. In some embodiments the one or more memory devices 1002 include random access memory (RAM), such as volatile data storage (e.g., dynamic RAM (DRAM) static RAM (SRAM), etc.). In some embodiments the one or more non-volatile data storage devices 1010 include a hard drive, a solid state drive, Flash memory, erasable programmable read only memory (EPROM), other non-volatile data storage devices, or any combination thereof. In some embodiments the one or more input devices 1006 include a keyboard 1014, a pointing device 1018 (e.g., a mouse, a track pad, etc.), a microphone 1012, a keypad 1016, a scanner 1020, a camera 1028, other input devices, or any combination thereof. In some embodiments the output devices 1008 include an electronic display 1022, a speaker 1026, a printer 1024, other output devices, or any combination thereof.

In some embodiments the one or more memory devices 1002 include a test wrapper (e.g., the test wrapper 100 of FIG. 1, the test wrapper 300 of FIG. 3, the test wrapper 500 of FIG. 5) according to embodiments disclosed herein. By way of non-limiting example, the one or more memory devices 1002 may include a BIST circuit (e.g., the BIST circuit 102 of FIG. 1, the P1500 BIST circuit 302 of FIG. 3, the P1500 BIST circuit 502 of FIG. 5) configured to operate a first speed. The one or more memory devices 1002 may also include a glue circuit (e.g., the glue circuit 106 of FIG. 1, the glue circuit 306 of FIG. 3, the glue circuit 506 of FIG. 5) configured to convert between second speed signals operating at a second speed different from the first speed and first speed signals that are compatible with operation of the BIST circuit.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
a built in self test (BIST) circuit for core circuitry of an integrated circuit device, the BIST circuit including a test interface, one or more inputs, and one or more outputs, the BIST circuit configured to operate at a first speed; and
a glue circuit configured to interface with the test interface, the one or more inputs, and the one or more outputs of the BIST circuit, the glue circuit configured to convert between second speed test interface signals and second speed input/output signals operating at a second speed and first speed test interface signals and first speed input/output signals operating at the first speed, the second speed different from the first speed.

2. The apparatus of claim 1, wherein the first speed is slower than the second speed.

3. The apparatus of claim 2, wherein:
the second speed input/output signals include a second speed serial input signal;
the first speed input/output signals include first speed parallel input signals; and
the glue circuit includes a deserializer configured to convert the second speed serial input signal to the first speed parallel input signals and provide the first speed parallel input signals to the one or more inputs of the BIST circuit.

4. The apparatus of claim 2, wherein:
the first speed input/output signals include first speed parallel output signals received from the one or more outputs of the BIST circuit;
the second speed input/output signals include a second speed serial output signal; and
the glue circuit includes a serializer configured to convert the first speed parallel output signals to the second speed serial output signal.

5. The apparatus of claim 1, wherein the first speed is faster than the second speed.

6. The apparatus of claim 5, wherein:
the second speed input/output signals include parallel input signals;
the first speed input/output signals include a first speed serial input signal; and
the glue circuit includes a serializer configured to convert the second speed parallel input signals to the first speed serial input signal and provide the first speed serial input signal to the one or more inputs of the BIST circuit.

7. The apparatus of claim 5, wherein:
the first speed input/output signals include a first speed serial output signal received from the one or more outputs of the BIST circuit;
the second speed input/output signals include second speed parallel output signals; and
the glue circuit includes a deserializer configured to convert the first speed serial output signal to the second speed parallel output signals.

8. The apparatus of claim 1, wherein the glue circuit is configured to provide, to the BIST circuit, a first speed wrapper clock configured to operate at the first speed.

9. An apparatus comprising:
a built in self test (BIST) circuit for core circuitry of an integrated circuit device, the BIST circuit including a test interface, one or more inputs, and one or more outputs;
a glue circuit electrically connected to the test interface, the one or more inputs, and the one or more outputs of the BIST circuit, the glue circuit configured to convert between second speed test interface signals and second speed input/output signals operating at a second speed and first speed test interface signals and first speed input/output signals operating at a first speed, the second speed different from the first speed; and
a clock generator configured to provide a first speed clock signal operating at the first speed to the glue circuit.

10. The apparatus of claim 9, further comprising the core circuitry, wherein the BIST circuit is configured to enable testing of the core circuitry.

11. The apparatus of claim 10, wherein the core circuitry includes circuitry for a logic die of a high bandwidth memory device.

12. The apparatus of claim 9, wherein the clock generator is configured to provide the first speed clock signal responsive to a reference clock signal.

13. The apparatus of claim 9, wherein the glue circuit includes:
- a deserializer electrically connected to the one or more inputs, the deserializer configured to provide first speed parallel input signals of the first speed input/output signals to the one or more inputs responsive to a second speed serial input signal of the second speed input/output signals; and
- a serializer electrically connected to the one or more outputs, the serializer configured to provide a second speed serial output signal of the second speed input/output signals responsive to first speed parallel output signals of the first speed input/output signals received from the one or more outputs.

14. The apparatus of claim 9, wherein:
- the first speed input/output signals include a first speed serial input signal and a first speed serial output signal, the first speed serial output signal received from the one or more outputs;
- the second speed input/output signals include second speed parallel input signals and second speed parallel output signals; and
- the glue circuit includes:
  - a serializer electrically connected to the one or more inputs, the serializer configured to provide the first speed serial input signal to the one or more inputs responsive to the second speed parallel input signals; and
  - a deserializer electrically connected to the one or more outputs, the deserializer configured to provide the second speed parallel output signals responsive to the first speed serial output signal.

15. The apparatus of claim 9, wherein the BIST circuit comprises a P1500 test wrapper control block.

16. The apparatus of claim 9, wherein the clock generator is configured to provide the first speed clock signal and receive a second speed wrapper clock signal operating at the second speed.

17. A method of interfacing with a built in self test (BIST) circuit, the method comprising:
- providing a first speed wrapper clock signal to the BIST circuit, the first speed wrapper clock signal operating at a first speed;
- providing first speed test interface signals operating at the first speed to a test interface of the BIST circuit responsive to second speed test interface signals operating at a second speed, the second speed different from the first speed;
- providing one or more first speed input signals operating at the first speed to one or more inputs of the BIST circuit responsive to one or more second speed input signals operating at the second speed; and
- providing one or more second speed output signals operating at the second speed responsive to one or more first speed output signals operating at the first speed received from one or more outputs of the BIST circuit.

18. The method of claim 17, wherein providing the first speed test interface signals comprises providing first speed select, capture, shift, and update wrapper signals responsive to second speed select, capture, shift, and update wrapper signals.

19. The method of claim 17, wherein:
- providing the one or more first speed input signals responsive to the one or more second speed input signals comprises providing first speed parallel input signals of the one or more first speed input signals responsive to a second speed serial input signal of the one or more second speed input signals; and
- providing the one or more second speed output signals responsive to the one or more first speed output signals comprises providing a second speed serial output signal of the one or more second speed output signals responsive to first speed parallel output signals of the one or more first speed output signals.

20. The method of claim 17, wherein:
- providing the one or more first speed input signals responsive to the one or more second speed input signals comprises providing a first speed serial input signal of the one or more first speed input signals responsive to second speed parallel input signals of the one or more second speed input signals; and
- providing the one or more second speed output signals responsive to the one or more first speed output signals comprises providing second speed parallel output signals responsive to a first speed serial output signal.

21. An apparatus, comprising:
- a circuit including one or more inputs and one or more outputs, the circuit configured to operate at a first speed, the one or more inputs configured to receive one or more first speed input signals, the one or more outputs configured to provide one or more first speed output signals; and
- a glue circuit configured to interface with the one or more inputs and the one or more outputs of the circuit, the glue circuit configured to convert between one or more second speed input signals operating at a second speed and the one or more first speed input signals operating at the first speed, the glue circuit further configured to convert between one or more second speed output signals operating at the second speed and the one or more first speed output signals operating at the first speed, the second speed different from the first speed.

* * * * *